United States Patent
Lee et al.

(10) Patent No.: US 9,109,682 B2
(45) Date of Patent: Aug. 18, 2015

(54) POWER TRANSMISSION APPARATUS FOR VEHICLE

(71) Applicant: Hyundai Motor Company, Seoul (KR)

(72) Inventors: Suengho Lee, Seoul (KR); Hyungwook Cho, Ansan-si (KR); Changwook Lee, Suwon-si (KR); Jongsool Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/539,747

(22) Filed: Nov. 12, 2014

(65) Prior Publication Data

US 2015/0184731 A1    Jul. 2, 2015

(30) Foreign Application Priority Data

Dec. 31, 2013  (KR) ......................... 10-2013-0168484

(51) Int. Cl.
*F16H 37/06* (2006.01)
*F16H 37/04* (2006.01)
*F16H 61/04* (2006.01)

(52) U.S. Cl.
CPC .......... *F16H 37/046* (2013.01); *F16H 61/0403* (2013.01); *F16H 2200/0052* (2013.01); *F16H 2200/0086* (2013.01); *F16H 2200/2005* (2013.01); *F16H 2200/2038* (2013.01); *Y10S 903/919* (2013.01)

(58) Field of Classification Search
CPC ....... F16H 37/02; F16H 37/04; F16H 37/042; F16H 37/06; F16H 37/046; F16H 2702/02; B60K 6/365; B60K 6/38; B60K 6/547
See application file for complete search history.

(56) References Cited

U.S. PATENT DOCUMENTS

| | | | |
|---|---|---|---|
| 6,306,057 B1 * | 10/2001 | Morisawa et al. | 475/5 |
| 7,155,994 B2 | 1/2007 | Gumpoltsberger | |
| 7,383,749 B2 | 6/2008 | Shafer et al. | |
| 2009/0280942 A1 | 11/2009 | Gumpoltsberger | |
| 2010/0173746 A1 * | 7/2010 | Ideshio et al. | 477/36 |
| 2010/0197436 A1 * | 8/2010 | Ideshio et al. | 475/8 |
| 2014/0100072 A1 * | 4/2014 | Kaltenbach et al. | 475/151 |

FOREIGN PATENT DOCUMENTS

| | | |
|---|---|---|
| JP | 2013-52798 A | 3/2013 |
| KR | 10-1338458 B1 | 12/2013 |
| WO | WO 2007/042109 A1 | 4/2007 |

* cited by examiner

*Primary Examiner* — Huan Le
(74) *Attorney, Agent, or Firm* — Morgan, Lewis & Bockius LLP (57) ABSTRACT

A power transmission apparatus may include: a torque converting device including a first rotation element directly connected to one power source and selectively fixed to a transmission housing, a second rotation element directly connected to another power source, and a third rotation element configured to output the torque of the another power source; an input device including a first input shaft directly connected to the third rotation element, selectively connected to the second rotation element, and provided with at least one input gear, and a second input shaft selectively connected to the second rotation element, and provided with at least one input gear; a first speed output unit configured to convert toque input from the first input shaft or the second input shaft; and a second speed output unit configured to convert torque input from the first input shaft or the second input shaft.

20 Claims, 5 Drawing Sheets

| Speed | CL1 | CL2 | B | SL1 | | | SL2 | | SL3 | | |
|---|---|---|---|---|---|---|---|---|---|---|---|
| | | | | D1 | N | D3 | N | D2 | D4 | N | R |
| First reverse speed | | | ● | | (●) | | (●) | | | | ● |
| Second reverse speed | ● | | | | (●) | | (●) | | | | ● |
| Reverse starting | | | | | (●) | | (●) | | | | ● |
| Neutral | | | | | (●) | | (●) | | | (●) | |
| Forward starting | | | | ● | | | (●) | | | (●) | |
| First forward speed | | | ● | ● | | | (●) | | | (●) | |
| Second forward speed | ● | | | ● | | | (●) | | | (●) | |
| Third forward speed | | ● | | | (●) | | | | ● | (●) | |
| Fourth forward speed | | | ● | | | ● | (●) | | | (●) | |
| Fifth forward speed | ● | | | | | ● | (●) | | | (●) | |
| Sixth forward speed | | ● | | | (●) | | (●) | | ● | | |

POWER TRANSMISSION APPARATUS FOR VEHICLE

CROSS-REFERENCE TO RELATED APPLICATION

The present application claims priority to and the benefit of Korean Patent Application No. 10-2013-0168484 filed on Dec. 31, 2013, the entire contents of which is incorporated herein for all purposes by this reference.

BACKGROUND OF THE INVENTION

1. Field of the Invention

The present invention relates to a power transmission apparatus for a vehicle. More particularly, the present invention relates to a power transmission apparatus for a vehicle that may achieve smooth starting and shifting and may improve fuel economy and acceleration performance as a consequence of adding a plurality of power sources and a torque converting device to a double clutch power transmitting apparatus.

2. Description of Related Art

Environmentally-friendly technique of vehicles is very important technique on which survival of future motor industry is dependent. Vehicle makers are focusing on development of environmentally-friendly vehicles so as to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

In addition, the vehicle makers promote improvement of efficiency in a power delivery system so as to meet exhaust regulation of countries and improve fuel consumption performance. In order to improve efficiency of the power delivery system, the vehicle makers are trying to put an idle stop and go (ISG) system and a regenerative braking system to practical use.

The ISG system stops an engine when a vehicle stops and restarts the engine when the vehicle begins to run. The regenerative braking system operates a generator using kinetic energy of the vehicle instead of braking the vehicle by friction when the vehicle brakes, stores electrical energy generated at this time in a battery, and reuses the electrical energy when the vehicle runs.

In addition, the hybrid electric vehicle is a vehicle using more than two power sources, and more than two power sources are combined in various ways. Typically, the hybrid electric vehicle uses a gasoline engine or a diesel engine driven by fossil fuel and a motor/generator driven by electrical energy.

In addition, one example of a transmission applied to the hybrid electric vehicle is the DCT. According to the DCT, two clutches are applied to a manual transmission layout. Therefore, efficiency and convenience may be improved.

That is, the DCT achieves odd-numbered-speeds and even-numbered-speeds alternately by using two clutches. A mechanism achieving the odd-numbered-speeds and the even-numbered-speeds alternately improves shift feel so as to solve problems of a conventional manual transmission (MT) and an automated manual transmission (AMT).

However, the DCT has such problems that clutch damage and energy loss due to clutch slip may occur when starting, safety may not be secured since backward rolling due to clutch slip occurs excessively in hill-start, shift shock may be strong compared with an automatic transmission since shift time is controlled to be short due to thermal capacity of a clutch.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission apparatus for a vehicle having advantages of achieving smooth starting and shifting by adding a plurality of power sources and a torque converting device to a double clutch transmission, improving fuel economy by enabling of regenerative braking, and improving acceleration performance by using torque of a motor/generator when acceleration.

Another embodiment of the present invention provides a power transmission apparatus for a vehicle having further advantages of achieving six forward speeds and two reverse speeds using five speed gears.

A power transmission apparatus for a vehicle according to various exemplary embodiments of the present invention may include: a torque converting device including a first rotation element directly connected to one power source and selectively fixed to a transmission housing, a second rotation element directly connected to another power source and configured to output torque of the another power source without rotation speed change, and a third rotation element configured to output the torque of the another power source with rotation speed being changed; an input device including a first input shaft directly connected to the third rotation element, selectively connected to the second rotation element, and provided with at least one input gear fixedly disposed on an exterior circumference thereof, and a second input shaft disposed without rotational interference with the first input shaft, selectively connected to the second rotation element, and provided with at least one input gear fixedly disposed on an exterior circumference thereof; a first speed output unit configured to convert toque input from the first input shaft or the second input shaft and output the converted torque; and a second speed output unit configured to convert torque input from the first input shaft or the second input shaft and output the converted torque.

The one power source may be a motor/generator and the another power source may be an engine.

The motor/generator may include: a stator fixed to the transmission housing; and a rotor rotatably disposed in the stator, directly connected to the first rotation element, and selectively connected to the transmission housing.

The power transmission apparatus may further include: a first clutch disposed between the second rotation element and the first input shaft; a second clutch disposed between the second rotation element and the second input shaft; and a brake disposed between the rotor and the transmission housing.

In one exemplary embodiment, a first input gear may be fixedly disposed on the second input shaft, and second, third, and fourth input gears may be fixedly disposed on the first input shaft.

The torque converting device may be a double pinion planetary gear set, wherein the first rotation element is a sun gear, the second rotation element is a planet carrier, and the third rotation element is a ring gear.

The first speed output unit may include: a first output shaft disposed in parallel with the first and second input shafts; a first output gear fixedly disposed on the first output shaft and outputting torque of the first output shaft; first, second, and third speed gears rotatably disposed on the first output shaft; a first synchronizer selectively connecting the first speed gear or the third speed gear to the first output shaft; and a second synchronizer selectively connecting the second speed gear to the first output shaft.

The first speed gear may be engaged with the second input gear, the second speed gear may be engaged with the first input gear, and the third speed gear may be engaged with the fourth input gear.

The second speed output unit may include: a second output shaft disposed in parallel with the first and second input shafts; a second output gear fixedly disposed on the second output shaft and outputting torque of the second output shaft; a fourth speed gear and a reverse speed gear rotatably disposed on the second output shaft; and a third synchronizer selectively connecting the fourth speed gear or the reverse speed gear to the second output shaft.

The power transmission apparatus may further include: a reverse speed unit configured to achieve a reverse shift-speed using the torque of the second output shaft.

The fourth speed gear may be engaged with the first input gear and the reverse speed gear may be operably connected to the third input gear through the reverse speed unit.

The reverse speed unit may include: an idle shaft disposed in parallel with the second output shaft; a first idle gear fixedly disposed on the idle shaft and engaged with the third input gear; and a second idle gear fixedly disposed on the idle shaft and engaged with the reverse speed gear.

In another exemplary embodiment, first, second, and third input gears may be fixedly disposed on the first input shaft, and a fourth input gear may be fixedly disposed on the second input shaft.

The torque converting device may be a double pinion planetary gear set, wherein the first rotation element is a planet carrier, the second rotation element is a sun gear, and the third rotation element is a ring gear.

The first speed output unit may include: a first output shaft disposed in parallel with the first and second input shafts; a first output gear fixedly disposed on the first output shaft and outputting torque of the first output shaft; first, second, and third speed gears rotatably disposed on the first output shaft; a first synchronizer selectively connecting the first speed gear or the third speed gear to the first output shaft; and a second synchronizer selectively connecting the second speed gear to the first output shaft.

The first speed gear may be engaged with the third input gear, the second speed gear may be engaged with the fourth input gear, and the third speed gear may be engaged with the first input gear.

The second speed output unit may include: a second output shaft disposed in parallel with the first and second input shafts; a second output gear fixedly disposed on the second output shaft and outputting torque of the second output shaft; a fourth speed gear and a reverse speed gear rotatably disposed on the second output shaft; and a third synchronizer selectively connecting the fourth speed gear or the reverse speed gear to the second output shaft.

The power transmission apparatus may further include a reverse speed unit configured to achieve a reverse shift-speed using the torque of the second output shaft.

The fourth speed gear may be engaged with the fourth input gear and the reverse speed gear may be operably connected to the second input gear through the reverse speed unit.

The reverse speed unit may include: an idle shaft disposed in parallel with the second output shaft; a first idle gear fixedly disposed on the idle shaft and engaged with the second input gear; and a second idle gear fixedly disposed on the idle shaft and engaged with the reverse speed gear.

In other exemplary embodiment, the torque converting device may be a single pinion planetary gear set, wherein the first rotation element is a sun gear, the second rotation element is a ring gear, and the third rotation element is a planet carrier.

In other exemplary embodiment, the torque converting device may be a single pinion planetary gear set, wherein the first rotation element is a ring gear, the second rotation element is a sun gear, and the third rotation element is a planet carrier.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

Figure 1:
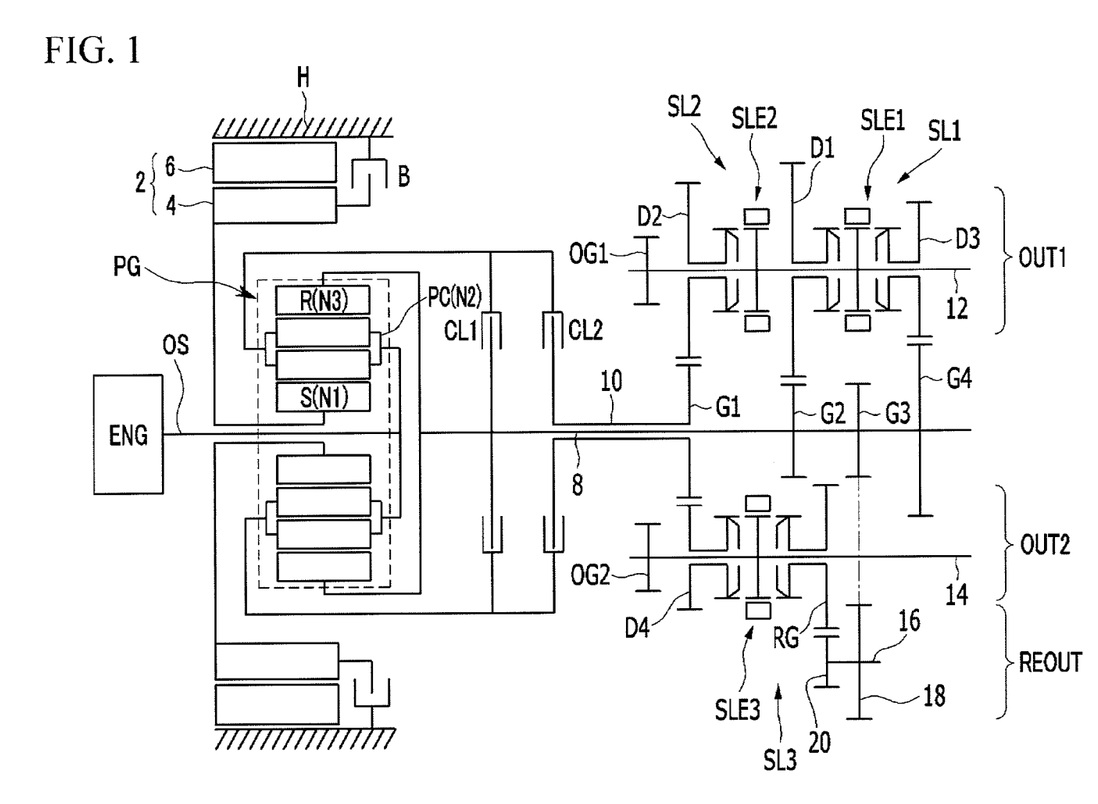
FIG. 1 is a schematic diagram of a power transmission apparatus for a vehicle according to the various exemplary embodiments of the present invention.

FIG. 1 is a schematic diagram of a power transmission apparatus for a vehicle according to the first exemplary embodiment of the present invention.

Referring to FIG. 1, a power transmission apparatus according to a first exemplary embodiment of the present invention includes an engine ENG and a motor/generator 2 that are power sources, a torque converting device, an input device, first and second speed output units OUT1 and OUT2, and a reverse speed unit REOUT.

A typical internal combustion engine may be used as the engine ENG and an output shaft OS of the engine ENG is connected to any one rotation element of the torque converting device.

In addition, the motor/generator 2 includes a rotor 4 and a stator 6 and is operated as a motor or a generator. The rotor 4 is connected to another rotation element of the torque converting device and the stator 6 is fixed to a transmission housing H.

The torque converting device is a planetary gear set PG, and a double pinion planetary gear set having three rotation elements is used as the torque converting device in the first exemplary embodiment of the present invention.

The three rotation elements include a first rotation element N1 being a sun gear S, a second rotation element N2 being a planet carrier PC, and a third rotation element N3 being a ring gear R.

The sun gear S being the first rotation element N1 is directly connected to the rotor 4 so as to receive torque of the rotor 4 or to transmit torque to the rotor 4.

In addition, the sun gear S being the first rotation element N1 as well as the rotor 4 is selectively connected to the transmission housing H through a brake B so as to be operated as a selective fixed element.

The planet carrier PC being the second rotation element N2 is directly connected to the output shaft OS of the engine ENG that is the power source so as to be operated as an input element and to transmit the torque of the engine ENG to the input device without rotation speed change.

The ring gear R being the third rotation element N3 is operated as an output element transmitting torque to the input device.

The input device includes a first input shaft 8 and a second input shaft 10.

One end portion of the first input shaft 8 is selectively connected to the second rotation element N2 directly connected to the engine ENG and is directly connected to the third rotation element N3.

The second input shaft 10 is a hollow shaft and is disposed at a radial exterior of the first input shaft 8 without rotational interference with the first input shaft 8. One end portion of the second input shaft 10 is selectively connected to the second rotation element N2 directly connected to the engine ENG.

A first input gear G1 is fixedly disposed on the second input shaft 10, and second, third, and fourth input gears G2, G3, and G4 are fixedly disposed on the first input shaft 8.

The second, third, and fourth input gears G2, G3, and G4 are positioned on the other end portion of the first input shaft 8 penetrating through the second input shaft 10 and are sequentially disposed from one end to the other end.

The first, second, third, and fourth input gears G1, G2, G3, and G4 are input gears operating at each speed.

In addition, the input device is selectively connected to the torque converting device through the first clutch CL1 and the second clutch CL2.

The first clutch CL1 is disposed between the first input shaft 8 and the second rotation element N2 so as to direct-couple the planetary gear set PG that is the torque converting device and to transmit rotation speed of the engine ENG to the first input shaft 8.

The second clutch CL2 is disposed between the second input shaft 10 and the second rotation element N2 so as to transmit rotation speed of the second rotation element N2 to the second input shaft 10.

The first and second clutches CL1 and CL2 and the brake B may be conventional multi-plate clutches of wet type and are controlled by a hydraulic control system. The first and second clutches CL1 and CL2 and the brake B may be multi-plate clutches of dry type.

The first and second speed output units OUT1 and OUT2 and the reverse speed unit REOUT configured to receive torque from each input gear of the input device, convert the torque, and out the converted torque are disposed in parallel with and apart from the first and second input shafts 8 and 10.

The first speed output unit OUT1 includes a first output shaft 12, first, second, and third speed gears D1, D2, and D3 rotatably disposed on the first output shaft 12, and first and second synchronizers SL1 and SL2.

The first output shaft 12 is disposed in parallel with and apart from the first and second input shafts 8 and 10.

The first speed gear D1 is engaged with the second input gear G2, the second speed gear D2 is engaged with the first input gear G1, and the third speed gear D3 is engaged with the fourth input gear G4.

In addition, the first synchronizer SL1 is disposed on the first output shaft 12 and selectively connects the first speed gear D1 or the third speed gear D3 to the first output shaft 12. The second synchronizer SL2 selectively connects the second speed gear D2 to the first output shaft 12.

In addition, the torque converted by the first speed output unit OUT1 is transmitted to a differential apparatus through a first output gear OG1 fixedly disposed on one end portion or the other end portion of the first output shaft 12.

The second speed output unit OUT2 includes a second output shaft 14, a fourth speed gear D4 and a reverse speed gear RG rotatably disposed on the second output shaft 14, and a third synchronizer SL3.

The second output shaft 14 is disposed in parallel with and apart from the first and second input shafts 8 and 10.

The fourth speed gear D4 is engaged with the first input gear G1 and the reverse speed gear RG is operably connected to the reverse speed unit REOUT.

In addition, the third synchronizer SL3 is disposed on the second output shaft 14 and selectively connects the fourth speed gear D4 or the reverse speed gear RG to the second output shaft 14.

In addition, the torque converted through the second speed output unit OUT2 is transmitted to the differential apparatus through a second output gear OG2 fixedly disposed on one end portion or the other end portion of the second output shaft 14.

The reverse speed unit REOUT includes an idle shaft 16, a first idle gear 18 having a large diameter, and a second idle gear 20 having a small diameter.

The idle shaft 16 is disposed in parallel with the second output shaft 14, the first idle gear 18 is engaged with the third input gear G3, and the second idle gear 20 is engaged with the reverse speed gear RG.

Therefore, torque of the first input shaft 8 is transmitted from the third input gear G3 to the reverse speed gear RG as inverse rotation speed through the first idle gear 18 of the large diameter and the second idle gear 20 of the small diameter, and the inverse rotation speed is transmitted to the differential apparatus through the second output gear OG2 fixedly disposed on the one end portion or the other end portion of the second output shaft 14 at reverse speed shift-speed.

Since the first, second, and third synchronizers SL1, SL2, and SL3 are well known to a person of an ordinary skill in the art, detailed description thereof will be omitted. In addition, first, second, and third sleeves SLE1, SLE2, and SLE3 applied respectively to the first, second, and third synchronizers SL1, SL2, and SL3, as well known to a person of an ordinary skill in the art, are operated by additional actuators and the actuators are controlled by a transmission control unit.

Figure 2:
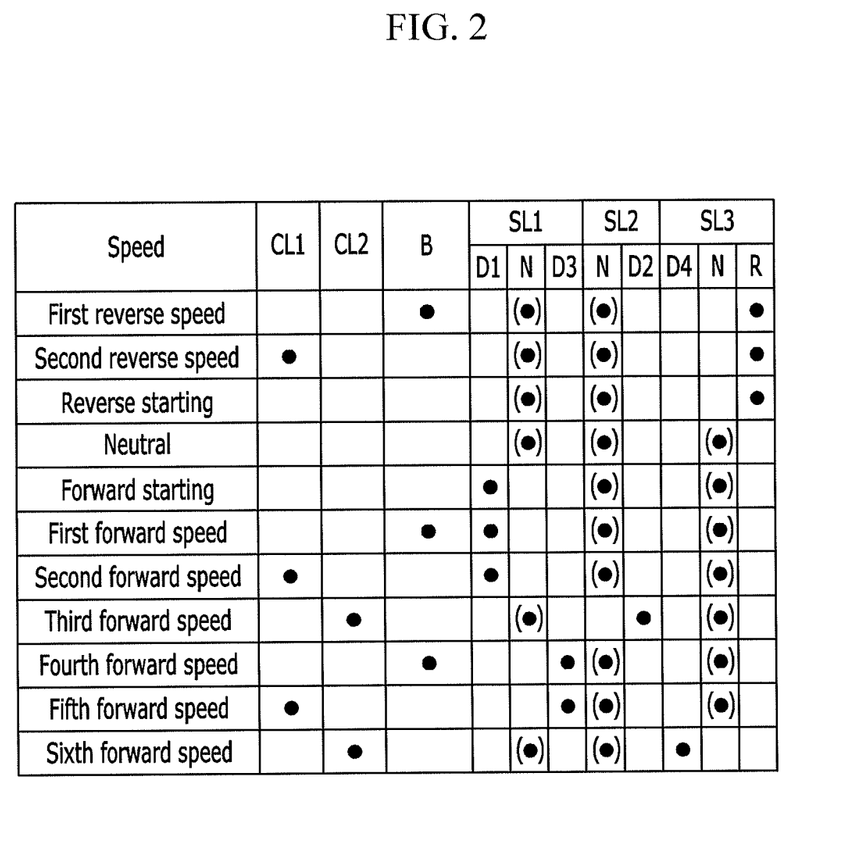
FIG. 2 is an operational chart of a power transmission apparatus for a vehicle according to the various exemplary embodiments of the present invention.

FIG. 2 is an operational chart of a power transmission apparatus for a vehicle according to the first exemplary embodiment of the present invention.

Referring to FIG. 2, the first clutch CL1 is operated at a second reverse speed, a second forward speed, and a fifth forward speed, the second clutch CL2 is operated at a third forward speed and a sixth forward speed, and the brake B is operated at a first reverse speed, a first forward speed, and a fourth forward speed.

[Neutral State]

At a neutral state, the first and second clutches CL1 and CL2 and the brake B are not operated and the sleeves SLE1, SLE2, and SLE3 of the first to the third synchronizers SL1, SL2, and SL3 are positioned at neutral positions.

At the neutral state, reverse starting is possible by operably connecting the second output shaft 14 with the reverse speed gear RG, and forward starting is possible by operably connecting the first output shaft 12 with the first speed gear D1.

In addition, a battery can be charged at the neutral N state. In this case, the first clutch CL1 is operated and the planetary gear set PG becomes a direct-coupling state. Therefore, the torque of the engine ENG is transmitted to the rotor 4 and the motor/generator 2 generates electric energy.

[First Reverse Speed]

If the second output shaft 14 and the reverse speed gear RG are operably connected through the sleeve SLE3 of the third synchronizer SL3 at the neutral N state, the reverse starting by the torque of the engine ENG is possible. If the brake B is operated at this state, a reduced rotation speed is transmitted to the first input shaft 8.

[Second Reverse Speed]

The second output shaft 14 and the reverse speed gear RG are operably connected through the sleeve SLE3 of the third synchronizer SL3 at the neutral N state. After that, if the first clutch CL1 is operated, a rotation speed of the engine ENG is transmitted to the first input shaft 8.

[First Forward Speed]

If the first output shaft 12 and the first speed gear D1 are operably connected through the sleeve SLE1 of the first synchronizer SL1 at the neutral N state, the forward starting by the torque of the engine ENG is possible. If the brake B is operated at this state, the reduced rotation speed is transmitted to the first input shaft 8.

[Second Forward Speed]

The brake B that was operated at the first forward speed is released and the first clutch CL1 is operated at the second forward speed. In this case, the rotation speed of the engine ENG is transmitted to the first input shaft 8.

At this time, the first output shaft 12 and the second speed gear D2 may be operably connected through the sleeve SLE2 of the second synchronizer SL2 for a next shift to the third forward speed.

[Third Forward Speed]

If the first output shaft 12 and the second speed gear D2 are operably connected through the sleeve SLE2 of the second synchronizer SL2, the first clutch CL1 is released, and the second clutch CL2 is operated at the second forward speed, the third forward speed is achieved.

At this time, the sleeve SLE1 of the first synchronizer SL1 is moved to the neutral position. On the contrary, the first output shaft 12 and the third speed gear D3 may be operably connected through the sleeve SLE1 of the first synchronizer SL1 for a next shift to the fourth forward speed.

[Fourth Forward Speed]

If the first output shaft 12 and the third speed gear D3 are operably connected through the sleeve SLE1 of the first synchronizer SL1, the second clutch CL2 is released, and the brake B is operated at the third forward speed, the reduced rotation speed is transmitted to the first input shaft 8 and the fourth forward speed is achieved.

[Fifth Forward Speed]

If the brake B is released and the first clutch CL1 is operated at the fourth forward speed, the rotation speed of the engine ENG is transmitted to the first input shaft 8 and the fifth forward speed is achieved.

At this time, the sleeve SLE2 of the second synchronizer SL2 is moved to the neutral position. In addition, the second output shaft 14 and the fourth speed gear D4 may be operably connected through the sleeve SLE3 of the third synchronizer SL3 for a next shift to the sixth forward speed.

[Sixth Forward Speed]

If the second output shaft 14 and the fourth speed gear D4 are operably connected through the sleeve SLE3 of the third synchronizer SL3, the first clutch CL1 is released, and the second clutch CL2 is operated at the fifth forward speed, the sixth forward speed is achieved.

Meanwhile, if the motor/generator 2 is operated in a state that the brake B is released, the torque of the motor/generator 2 and the torque of the engine ENG are added at the torque converting device and the added torque is output to the input device.

In addition, if the vehicle runs at forward shift-speed or reverse shift-speed, the regenerative braking is possible through the motor/generator 2.

According to the first exemplary embodiment of the present invention, smooth shifting and starting may be possible by using the engine ENG and the planetary gear set PG that is the torque converting device.

In addition, slip of the clutches may be minimized and regenerative braking is performed at deceleration. Therefore, fuel economy may be improved.

In addition, when the vehicle accelerates at the second forward speed, the third forward speed, the fifth forward speed, or the sixth forward speed, the torque of the motor/generator 2 is used as auxiliary torque. Therefore, acceleration performance may be improved.

Since the power transmission apparatus according to the first exemplary embodiment of the present invention can achieve six forward speeds and two reverse speeds using five speed gears, the number of components, weight and length of the transmission, and manufacturing cost may be reduced, compared with a double clutch transmission achieving the same number of shift-speeds.

Figure 3:
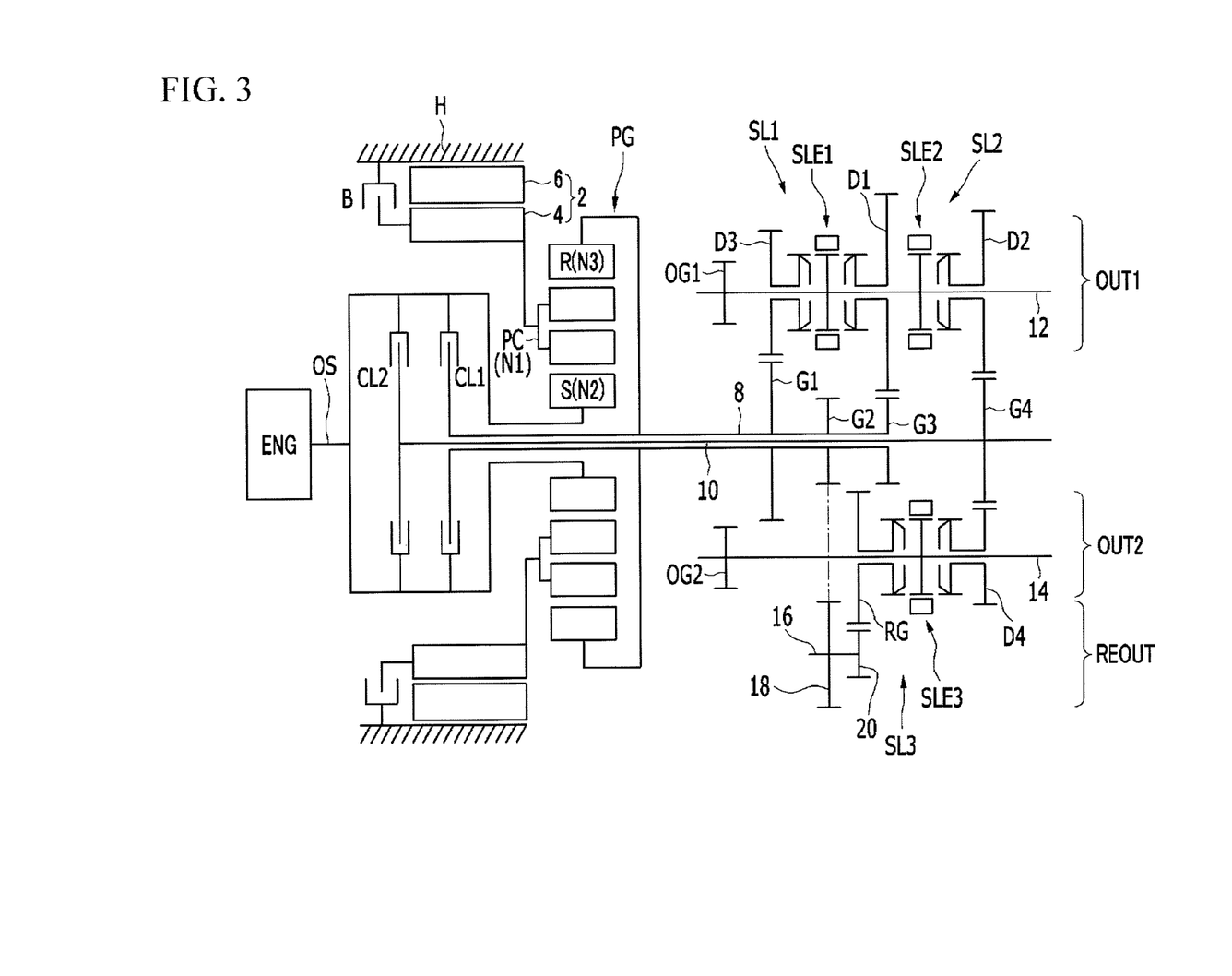
FIG. 3 is a schematic diagram of a power transmission apparatus for a vehicle according to the various exemplary embodiments of the present invention.

FIG. 3 is a schematic diagram of a power transmission apparatus for a vehicle according to the second exemplary embodiment of the present invention.

According to the second exemplary embodiment of the present invention, the first, second, and third input gears G1, G2, and G3 are sequentially disposed on the first input shaft 8 and the fourth input gear G4 is disposed on the second input shaft 10.

In addition, the third, first, and second speed gears D3, D1, and D2 are sequentially disposed on the first output shaft 12 and are engaged respectively with the first, third, and fourth input gears G1, G3, and G4. The reverse speed gear and the fourth speed gear RG and D4 are sequentially disposed on the second output shaft 14, the fourth speed gear is engaged with the fourth input gear G4, the reverse speed gear RG is engaged with the second idle gear 20, and the first idle gear 18 is engaged with the second input gear G2.

In addition, the first rotation element N1 is the planet carrier PC, the second rotation element N2 is the sun gear S, and the third rotation element N3 is the ring gear R in the planetary gear set PG.

At this time, the first clutch CL1 is disposed between the sun gear S and the first input shaft 8 and the second clutch CL2 is disposed between the sun gear S and the second input shaft 10.

Since functions of the second exemplary embodiment of the present invention are the same as those of the first exemplary embodiment except arrangements of the input gears on the first and second input shafts 8 and 10 and speed gears on the first and second output shafts 12 and 14, connections between the input gears and the speed gears, and constituent elements of the planetary gear set PG including the first and second rotation elements N1 and N2, detailed description thereof will be omitted.

Figure 4:
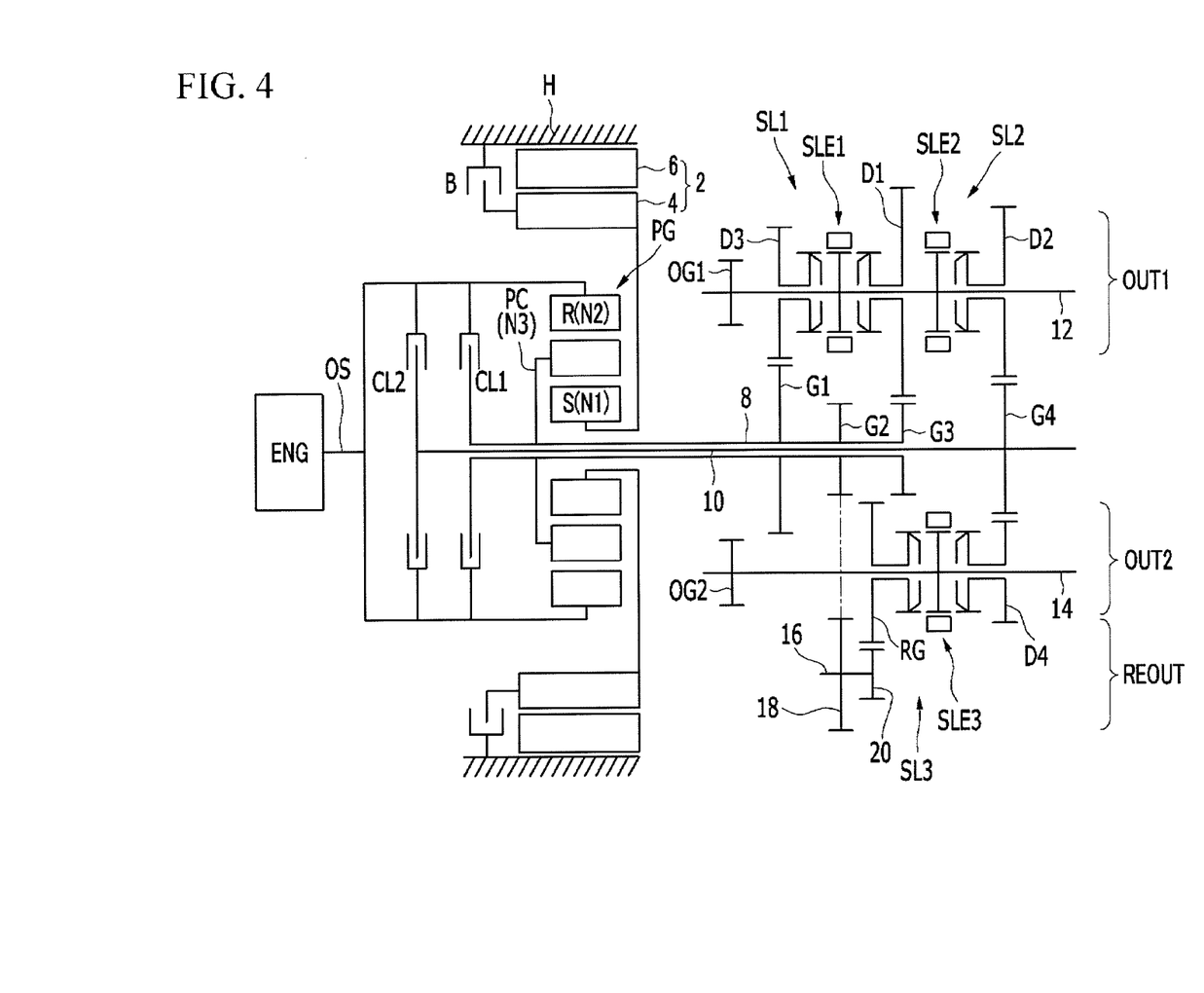
FIG. 4 is a schematic diagram of a power transmission apparatus for a vehicle according to the various exemplary embodiments of the present invention.

FIG. 4 is a schematic diagram of a power transmission apparatus for a vehicle according to the third exemplary embodiment of the present invention.

Referring to FIG. 4, the planetary gear set PG is a single pinion planetary gear set in the third exemplary embodiment.

That is, the first rotation element is the sun gear S, the second rotation element is the ring gear R, and the third rotation element is the planet carrier PC in the third exemplary embodiment.

At this time, the first clutch CL1 is disposed between the ring gear R and the first input shaft 8 and the second clutch CL2 is disposed between the ring gear R and the second input shaft 10.

Since functions of the third exemplary embodiment of the present invention are the same as those of the second exemplary embodiment except constituent elements of the planetary gear set PG including the first, second, and third rotation elements N1, N2, and N3, detailed description thereof will be omitted.

Figure 5:
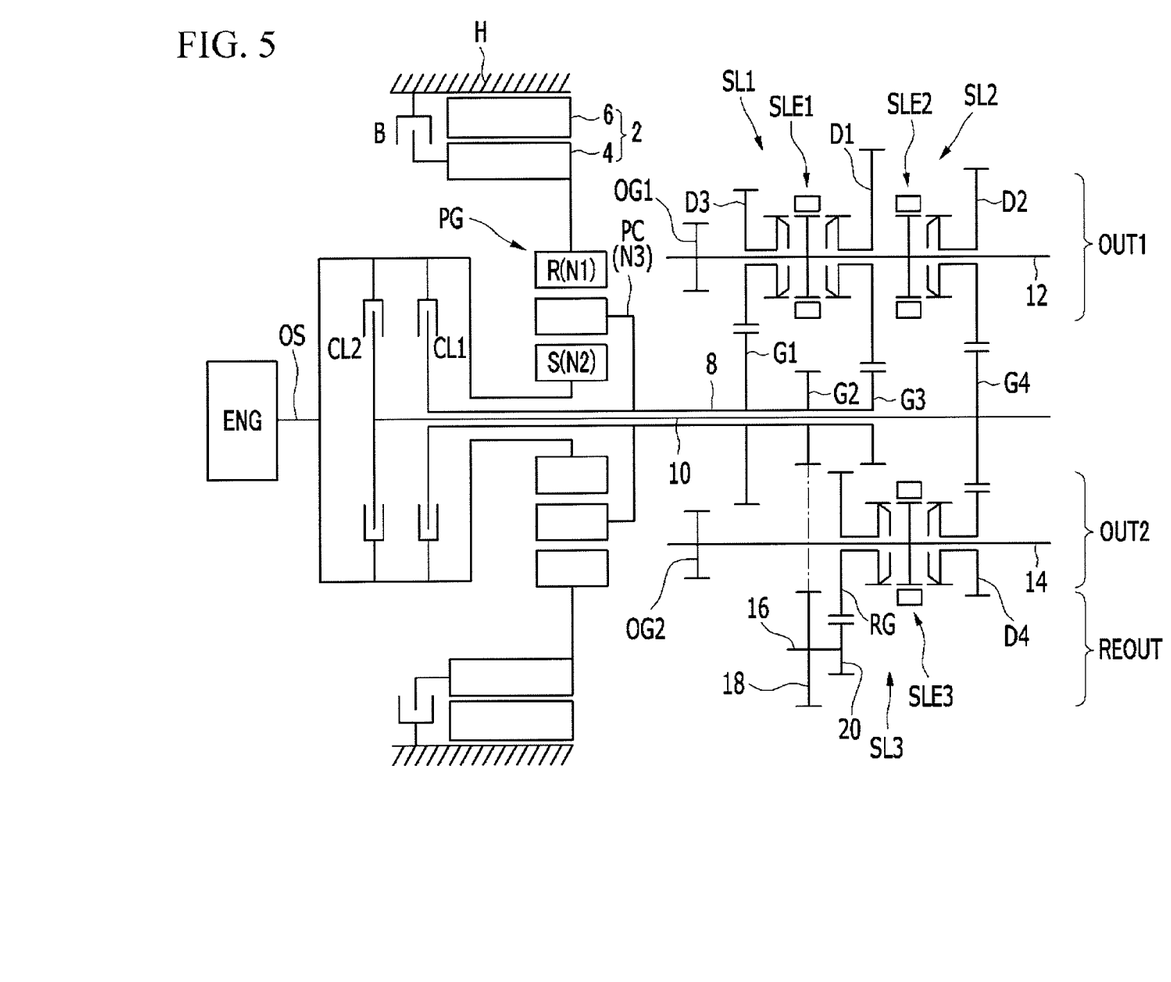
FIG. 5 is a schematic diagram of a power transmission apparatus for a vehicle according to the various exemplary embodiments of the present invention.

FIG. 5 is a schematic diagram of a power transmission apparatus for a vehicle according to the fourth exemplary embodiment of the present invention.

Referring to FIG. 5, the planetary gear set PG is a single pinion planetary gear set in the fourth exemplary embodiment. In addition, the first rotation element is the ring gear R, the second rotation element is the sun gear S, and the third rotation element is the planet carrier PC.

At this time, the first clutch CL1 is disposed between the sun gear S and the first input shaft 8 and the second clutch CL2 is disposed between the sun gear S and the second input shaft 10.

Since functions of the fourth exemplary embodiment of the present invention are the same as those of the third exemplary embodiment except constituent elements of the planetary gear set PG including the first, second, and third rotation elements N1, N2, and N3, detailed description thereof will be omitted.

According to the exemplary embodiments of the present invention, smooth starting and shifting may be achieved by outputting the torques of the engine and the motor/generator through the planetary gear set.

In addition, slip of the clutches may be minimized and regenerative braking is performed at deceleration. Therefore, fuel economy may be improved.

Since the torque of the motor/generator is used as auxiliary torque when the vehicle accelerates, acceleration performance may be improved.

Since six forward speeds and two reverse speeds can be achieved using five speed gears, the number of components, weight and length of the transmission, and manufacturing cost may be reduced, compared with a double clutch transmission achieving the same number of shift-speeds.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A power transmission apparatus for a vehicle comprising:
   a torque converting device including:
      a first rotation element directly connected to one power source and selectively fixed to a transmission housing;
      a second rotation element directly connected to another power source; and
      a third rotation element;
   an input device including:
      a first input shaft directly connected to the third rotation element, selectively connected to the second rotation element, and provided with at least one input gear fixedly disposed on an exterior circumference thereof; and
      a second input shaft disposed without rotational interference with the first input shaft, selectively connected to the second rotation element, and provided with at least one input gear fixedly disposed on an exterior circumference thereof;
   a first speed output unit configured to convert torque input from the first input shaft or the second input shaft and output a converted torque; and
   a second speed output unit configured to convert torque input from the first input shaft or the second input shaft and output a converted torque.

2. The power transmission apparatus of claim 1, wherein the one power source is a motor/generator and the another power source is an engine.

3. The power transmission apparatus of claim 2, wherein the motor/generator comprises:
- a stator fixed to the transmission housing; and
- a rotor rotatably disposed in the stator, directly connected to the first rotation element, and selectively connected to the transmission housing.

4. The power transmission apparatus of claim 3, further comprising:
- a first clutch disposed between the second rotation element and the first input shaft;
- a second clutch disposed between the second rotation element and the second input shaft; and
- a brake disposed between the rotor and the transmission housing.

5. The power transmission apparatus of claim 1,
wherein a first input gear is fixedly disposed on the second input shaft, and
wherein second, third, and fourth input gears are fixedly disposed on the first input shaft.

6. The power transmission apparatus of claim 5, wherein the torque converting device is a double pinion planetary gear set, wherein the first rotation element is a sun gear, the second rotation element is a planet carrier, and the third rotation element is a ring gear.

7. The power transmission apparatus of claim 5, wherein the first speed output unit comprises:
- a first output shaft disposed in parallel with the first and second input shafts;
- a first output gear fixedly disposed on the first output shaft and outputting torque of the first output shaft;
- first, second, and third speed gears rotatably disposed on the first output shaft;
- a first synchronizer selectively connecting the first speed gear or the third speed gear to the first output shaft; and
- a second synchronizer selectively connecting the second speed gear to the first output shaft.

8. The power transmission apparatus of claim 7, wherein the first speed gear is engaged with the second input gear, the second speed gear is engaged with the first input gear, and the third speed gear is engaged with the fourth input gear.

9. The power transmission apparatus of claim 7, wherein the second speed output unit comprises:
- a second output shaft disposed in parallel with the first and second input shafts;
- a second output gear fixedly disposed on the second output shaft and outputting torque of the second output shaft;
- a fourth speed gear and a reverse speed gear rotatably disposed on the second output shaft; and
- a third synchronizer selectively connecting the fourth speed gear or the reverse speed gear to the second output shaft.

10. The power transmission apparatus of claim 9, further comprising a reverse speed unit configured to achieve a reverse shift-speed using the torque of the second output shaft,
wherein the fourth speed gear is engaged with the first input gear and the reverse speed gear is operably connected to the third input gear through the reverse speed unit.

11. The power transmission apparatus of claim 10, wherein the reverse speed unit comprises:
- an idle shaft disposed in parallel with the second output shaft;
- a first idle gear fixedly disposed on the idle shaft and engaged with the third input gear; and
- a second idle gear fixedly disposed on the idle shaft and engaged with the reverse speed gear.

12. The power transmission apparatus of claim 1,
wherein first, second, and third input gears are fixedly disposed on the first input shaft, and
wherein a fourth input gear is fixedly disposed on the second input shaft.

13. The power transmission apparatus of claim 12, wherein the torque converting device is a double pinion planetary gear set, wherein the first rotation element is a planet carrier, the second rotation element is a sun gear, and the third rotation element is a ring gear.

14. The power transmission apparatus of claim 12, wherein the torque converting device is a single pinion planetary gear set, wherein the first rotation element is a sun gear, the second rotation element is a ring gear, and the third rotation element is a planet carrier.

15. The power transmission apparatus of claim 12, wherein the torque converting device is a single pinion planetary gear set, wherein the first rotation element is a ring gear, the second rotation element is a sun gear, and the third rotation element is a planet carrier.

16. The power transmission apparatus of claim 12, wherein the first speed output unit comprises:
- a first output shaft disposed in parallel with the first and second input shafts;
- a first output gear fixedly disposed on the first output shaft and outputting torque of the first output shaft;
- first, second, and third speed gears rotatably disposed on the first output shaft;
- a first synchronizer selectively connecting the first speed gear or the third speed gear to the first output shaft; and
- a second synchronizer selectively connecting the second speed gear to the first output shaft.

17. The power transmission apparatus of claim 16, wherein the first speed gear is engaged with the third input gear, the second speed gear is engaged with the fourth input gear, and the third speed gear is engaged with the first input gear.

18. The power transmission apparatus of claim 16, wherein the second speed output unit comprises:
- a second output shaft disposed in parallel with the first and second input shafts;
- a second output gear fixedly disposed on the second output shaft and outputting torque of the second output shaft;
- a fourth speed gear and a reverse speed gear rotatably disposed on the second output shaft; and
- a third synchronizer selectively connecting the fourth speed gear or the reverse speed gear to the second output shaft.

19. The power transmission apparatus of claim 18, further comprising a reverse speed unit configured to achieve a reverse shift-speed using the torque of the second output shaft,
wherein the fourth speed gear is engaged with the fourth input gear and the reverse speed gear is operably connected to the second input gear through the reverse speed unit.

20. The power transmission apparatus of claim 19, wherein the reverse speed unit comprises:
- an idle shaft disposed in parallel with the second output shaft;
- a first idle gear fixedly disposed on the idle shaft and engaged with the second input gear; and
- a second idle gear fixedly disposed on the idle shaft and engaged with the reverse speed gear.

* * * * *